United States Patent [19]

Barr

[11] Patent Number: 5,579,282
[45] Date of Patent: Nov. 26, 1996

[54] METHOD FOR DETERMINING THE SHEAR-WAVE VELOCITY BENEATH A BODY OF WATER

[75] Inventor: Frederick J. Barr, Houston, Tex.

[73] Assignee: Western Atlas International, Inc., Houston, Tex.

[21] Appl. No.: 519,464

[22] Filed: Aug. 25, 1995

[51] Int. Cl.⁶ .............................. G01V 1/28; G01V 1/38
[52] U.S. Cl. ................... 367/75; 367/15; 367/21
[58] Field of Search ................... 367/15, 21, 75, 367/38, 36, 37; 181/110

[56] References Cited

U.S. PATENT DOCUMENTS 4,817,061  3/1989  Alford et al. .............................. 367/75
5,265,016  11/1993  Hanson et al. ............................ 367/75

OTHER PUBLICATIONS

Lindseth, R. O. "Synthetic sonic logs–a process for stratigraphic interpretation," Geophysics, vol. 44, No. 1 (Jan. 1979); pp. 3–26, 22 figs.

*Primary Examiner*—Ian J. Lobo
*Attorney, Agent, or Firm*—William A. Knox

[57] ABSTRACT

A method for measuring the velocity of shear waves in a formation beneath a body of water. The shear wave velocity is derived from the parameters of water density, water-bottom reflection coefficient, formation compressional wave, velocity and the propagation velocity of a submarine ground-roll wave front.

6 Claims, 3 Drawing Sheets

5,579,282

1

METHOD FOR DETERMINING THE SHEAR-WAVE VELOCITY BENEATH A BODY OF WATER

BACKGROUND OF THE INVENTION

1. Field of the Invention

A method for indirectly measuring the velocity of shear waves propagating in a formation lying beneath a body of water.

2. Discussion of Related Art

In marine geophysical exploration, and with reference to FIG. 1, a long array 10 of seismic sensors such as 12, 12', 12", usually hydrophones but which may sometimes be combined with motion sensors, are towed at or near the water surface 14 behind a ship 16 by suitable towing means 18. Six sensors are shown but 1000 or more may be used in practice. A sound source 20 of any desired type, preferably unpolarized, upon command radiates an acoustic wavefield 22 in the water that insonifies the earth layers (not shown) below water bottom 24. As will next be explained, the wavefield propagates in many different modes.

As is well known in the geophysical profession, a portion of the wavefield energy travels directly through the water from the source to the sensors as a direct arrival. Another portion of the energy is refracted along the water-bottom formation as a compressional (P) wave and as a converted shear or S-wave. The remaining portion of the wavefield energy propagates downwardly to acoustically illuminate sub-bottom strata. The P-waves are refracted back to the sensors as shown by arrows 25, 25', 25", but not the S-waves because they cannot propagate through a fluid.

Under certain conditions, a portion of the wavefield may propagate along the water/formation interface as a boundary wave, sometimes classified as a Stoneley wave. The vertical component of the boundary wave may generate a converted compressional wave in the water that may be detected by the seismic sensors. The Stoneley wave counterpart on dry land is a Rayleigh wave. The remainder of the downgoing radiant energy is reflected from the water bottom surface as well as from sub-bottom earth layers as later-arriving reflected P-waves.

The basic concepts of reflection and refraction of wavefields impinging on earth strata as applied to seismic exploration are fundamental, well known to geophysicists and thus need not be reviewed here. U.S. Pat. No. 4,979,150, issued Dec. 28. 1990 to F. J. Barr, which is incorporated herein by reference, includes a tutorial in connection with FIG. 8–10 of that patent with respect to the relation between wavefield ray paths, angles of incidence, refraction velocities and reflection coefficients. FIG. 2 of this disclosure which will be discussed in detail later defines the nomenclature to be used herein.

The multimodal seismic wavefield arrivals are detected by the sensors such as 12, 12', 12" which convert the received acoustic energy to electrical signals. The electrical signals are transmitted back to the ship over any desired type of signal transmission means which may be incorporated as part of the sensor towing means 18. The data transmission means may transmit data signals by electrical, optical or ethereal means. The data signals may be transmitted in analog or digital format as desired. Each sensor or group of sensors may transmit data over a dedicated channel or the signals from many sensors may be multiplexed over a single channel. Data signals received at the ship 10 from the

2 sensors via the transmission means 18 and line 15 and are input to a computer 17 where they are recorded for archival storage and later processing by any preferred means including electrical, magnetic, optical, chemical, molecular or any other storage means including the memory of a computer 17 (dashed lines) and a programmable central processor unit (CPU) including an arithmetic logic unit (ALU), mounted in ship 16.

Knowledge of the shear wave velocity vectors characteristic of a formation is useful in measuring the alignment of fracture planes of desired target formations. Such data are needed for orienting the direction of a deviated borehole to maximize oil recovery. See for example, U.S. Pat. No. 4,817,061, issued Mar. 28, 1989 to R. M. Alford. The method relies upon use of polarized shear-wave sensors positioned above a target formation along a line of survey to measure and resolve the shear wave velocity vectors along different azimuths. Preferably a polarized source is used. The polarization of the source matches the polarization of the sensors. The fracture plane is said to lie parallel to the axis of the maximum shear wave velocity vector. That patent is directed to land surveying but it could be adapted to marine use. To apply the method of the Alford patent, two separate sensors, orthogonally polarized, would need to be emplaced directly on the sea floor in order to feel the S-waves. Thus, two sensors would be needed to replace each one of the single hydrophones shown in FIG. 1. Furthermore, the source must be polarized.

Shear wave data are also useful in engineering studies for deriving selected elastic moduli such as Poisson's ratio, $\sigma$, and Young's modulus, E, that are characteristic of the water-bottom formation. Those quantities are required for estimating the load-bearing capability of the sea floor for supporting an offshore structure such as a drilling platform 26, FIG. 1. Poisson's ratio, $\sigma$, is computed from $$\sigma = (R_1^2 - 2)/2(R_1^2 - 1), \quad (1)$$

where $R_1 = V_p/V_s$ and Young's modulus, E, is given by $$E = 2\rho V_s^2 (1 + \sigma), \quad (2)$$

where $V_p$ is the P-wave velocity, $V_s$ is the S-wave velocity and $\rho$ is the formation density.

Throughout this disclosure, the term "velocity" is a shorthand term that means the velocity of propagation of an acoustic wavefield through a medium under discussion. If the term is used in any other sense, it will be redefined as needed.

As explained previously, shear waves do not propagate in a fluid. The towed pressure sensors used for conventional seismic exploration are sensitive only to P-waves. Prior methods, such as taught by Alford above, for measuring shear waves require use of special sensors placed directly on the water bottom. That practice is slow and expensive.

There is a need for an economical method for estimating selected elastic parameters of undersea formations and for using those data for satisfying technological and engineering requirements involving exploitation of natural resources associated with those formations. Preferably the method employs routine marine exploration techniques.

SUMMARY OF THE INVENTION

In accordance with this invention, there is provided a method for estimating and using selected elastic parameters of an earth formation beneath a body of water having a known velocity and density. The reflection coefficient, k, of the interface between the water and the formation is known a priori or it may be measured. A near-field acoustic impulse is injected by an acoustic source from the water into the earth layer. The impulse presents a significantly curved wavefront to the earth layer at the boundary between the water and the formation, thereby generating a multimodal wavefield that includes a direct-wave propagation mode, a refracted-wave propagation mode and a boundary-wave propagation mode. An array, preferably linear, of spaced-apart seismic sensors is deployed along a desired line of survey, detects acoustic signals representative of the multimode wavefield and transmits the signals to a programmed computer for archival storage and processing. The computer includes at least a data storage means, a programmable arithmetic logic unit and a display means. The detected signals indicative of the arrival times of the detected acoustic signals at each of the sensors are stored in the computer in time-scale format. The stored signals are then decomposed into separate data sets corresponding to the individual propagation modes of the multimodal signals. The data sets are processed in the ALU to derive refracted formation velocity and boundary wave velocity. A first portion of the ALU, is programmed to calculate the formation density from input values for the known water density, the known reflection coefficient and water- and refracted-formation-wave velocities. A second portion of the ALU is programmed to calculate the shear wave velocity vector along the line of survey from the known value for water density, the calculated formation density and the derived water-, refracted-formation- and boundary-wave velocities.

In an aspect of this invention, the acoustic source is positioned at a radius r above the boundary between the water and the formation, where $0 \leq r < 10$ meters.

In another aspect of this invention, the shear wave velocity vectors are calculated for each of a first and a second azimuth. The velocity vectors are resolved to define the azimuth of the strike of the vertical formation fracture plane.

In yet another aspect of this invention, the derived refracted formation-wave velocity, the calculated shear wave velocity and the calculated formation density are combined to derive selected elastic moduli useful in estimating the load-bearing characteristics of the formation.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Definition of the formation fracture plane or evaluation of selected elastic moduli of a formation, such as Poisson's ratio and Young's modulus from (1) and (2) mentioned earlier, are useful in natural resource exploitation and in engineering applications. Such applications require quantitative estimates of wavefield propagation parameters including the velocities of compressional and shear waves as well as the formation density. This disclosure teaches a method for estimating the shear wave velocity and the formation density using routine exploration tools without the need for special instrumentation.

Figure 2:
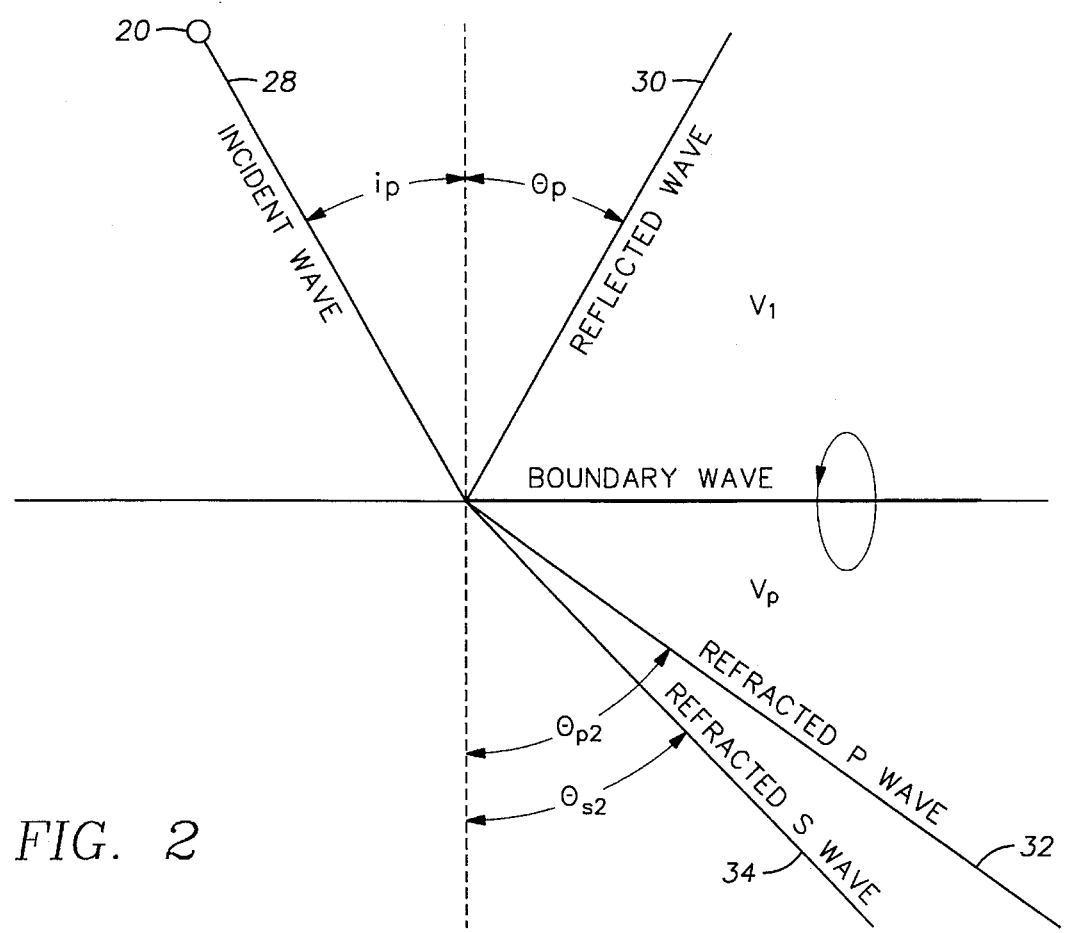
FIG. 2 is a ray-path diagram showing the Snell's law relationship for the respective wavefield propagation modes.

FIG. 2 illustrates Snell's law relationships for the propagation modes of a multimode wavefield incident on the boundary between two media. For purposes of this discussion and by way of example but not by way of limitation, the upper medium is water while the lower medium is a rock formation. An acoustic source 20, generates a wavefield (a P-wave) which propagates along incident ray path 28 as an impulse having an amplitude of 1. The wavefield impinges on boundary 24 at an incident angle $i_p$ and is reflected from boundary 24 at an angle of reflection $\theta_p$, where $i_p = \theta_p$, as reflected P-wave ray path 30, having an amplitude A. The amplitude A is proportional to the coefficient of reflection of boundary 24, which for $i_p = 0$ is given by $$k = (\rho V_p - \rho' V_1)/(\rho V_p + \rho' V_1), \qquad (3)$$

where $\rho'$, $\rho$ and $V_1$, $V_p$ are the densities and P-wave velocities of the water and formation respectively. Formulation (3) is quite general and applies to any optical or acoustic interface between two media, not merely to the water/formation boundary At the water/formation boundary, the incident wavefield as represented by ray 28 is refracted according to Snell's law as a multimode wavefield including refracted P-wave ray 32 and converted S-wave ray 34. The double-headed arrows indicate the polarity convention and polarization of the refracted rays. It is assumed in FIG. 2 that $V_p > V_1$ and that $V_s = 0.5 \, V_p$. A portion of the incident energy continues downwardly to become reflected from other strata below.

Under certain conditions, particularly in the near field, a boundary wave may be generated which propagates along the boundary 24 as a Stoneley wave at a boundary-wave velocity, c. A Stoneley wave propagates along a liquid/solid boundary. The waveform is said to exhibit a retrograde elliptical propagation mode having a component in both the longitudinal×direction and in the vertical, ±z direction. Its velocity, c, may be on the order of $0.8-0.9 \, V_s$. The near field is defined as distance between a source and a wavefront that is less than the wavelength of the wavefield. The wavefront is significantly curved in that region.

I have discovered that the shear wave velocity can be derived from measurement of the water velocity, the refracted formation velocity, the water density, the formation density and, most importantly, the velocity of the boundary wave, all of which quantities can be derived from routine exploration practice without the need for special instrumentation.

From the literature, such as *Encyclopedic Dictionary of Exploration Geophysics*, third edition, by R. E. Sheriff, the general wave equation is expressed by $$\nabla^2 \psi = \frac{\partial^2 \psi}{\partial x^2} + \frac{\partial^2 \psi}{\partial y^2} + \frac{\partial^2 \psi}{\partial z^2} - \left(\frac{1}{V^2}\right)\frac{\partial^2 \psi}{\partial t^2} = 0. \qquad (4)$$

After a considerable amount of algebraic manipulation, it can be shown that, for the model of FIG. 2 and for the boundary wave, (4) reduces to $$(c^2/v_s^2 - 2)^2 + \rho' c^4/\rho V_s^4 - 4(1 - c^2/V_p^2)^{1/2}(1 - c^2/V_s^2)^{1/2} = 0, \qquad (5)$$

where
- c=boundary wave velocity,
- $V_s$=formation shear wave velocity,
- $V_p$=formation compressional wave velocity,
- $\rho'$=water density, and
- $\rho$=formation density.

Of those quantities, c and $V_p$ can be measured from seismic data The water density, $\rho'$, is assumed to be known a priori from hydrographic tables of salinity and temperature and averages about 1024 kg/m³ for sea water. The value $V_s$ as above determined is a velocity vector directed along the line of survey.

Formation bulk density $\rho$ can be computed from (3) above by solving for $\rho$ explicitly in terms of k as:

$$\rho = \frac{\rho' V_1}{V_p} \frac{(1+k)}{(1-k)}. \tag{6}$$

where $V_1$ is the water velocity which may be measured from the seismic data, measured by a velocimeter or known from oceanographic tables of temperature and salinity. The water-bottom reflection coefficient, k, is assumed to be known for purposes of this disclosure since it can be computed readily from the routinely-gathered measurements of water velocity, $V_1$ and refracted formation velocity $V_p$ (in meters per second) by $$k=(V_p-V_1)/(V_p+V_1-2109.8), \tag{7}$$

adapted from *Synthetic Sonic Logs—A Process for Stratigraphic Interpretation*, by Roy O. Lindseth, Geophysics, v. 44, n.1, 1979. Alternatively, reflection coefficient k may be derived by use of calibration shots such as described in U.S. Pat. No. 4,979,150 previously cited.

The measured primary parameters and secondary quantities as derived from the measured data may be inserted into (5) which may now be solved for the shear wave velocity $V_s$ from the observed and derived values for c, $V_p$, $\rho$ and $\rho'$ by starting with an estimated trial value for $V_s$, using a root finding iterative numerical solution by bracketing the interval (a,b) where the functions f(a) and f(b) change sign across the interval, given the restraint that $c<V_s$.

Figure 1:
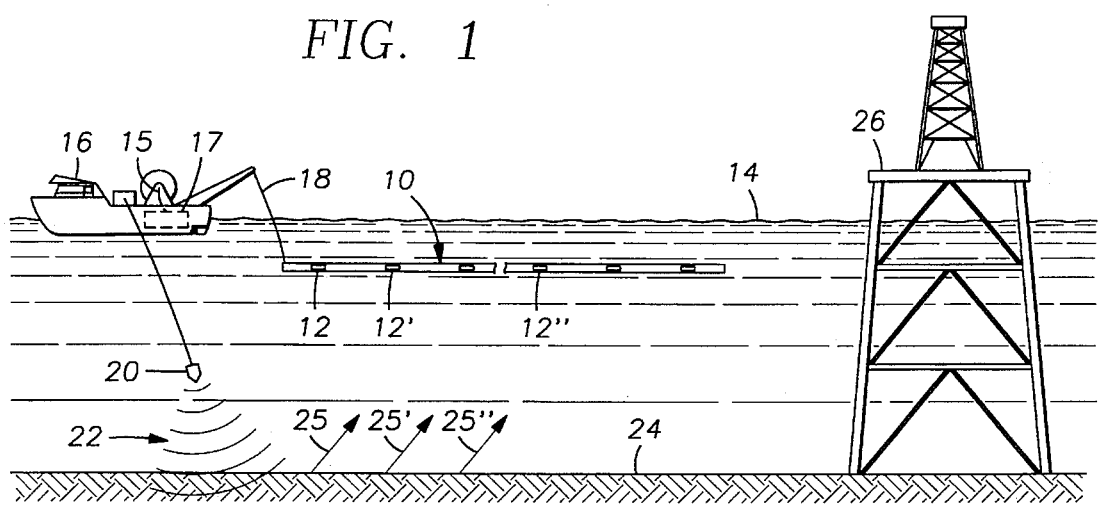
FIG. 1 illustrates a seismic ship towing a seismic sensor array through a body of water near an offshore drilling platform.

In operation and with reference to FIG. 1, a sound source 20 of any desired type, preferably non-polarized, generates a multimodal acoustic wavefield 22. Preferably, the wavefield is presented to the water bottom formation 24 as a spherical, near-field wavefront rather than as a plane wavefront which inherently develops in the far field. Preferably the source is placed at a distance, r, from the water bottom 24 where 0≤r<10 meters. The purpose of this arrangement is to actually favor formation of a boundary wave at the interface between the water and the formation because the boundary wave velocity, c, is essential in the solution of (5) above. Additionally of course, the usual compressional reflected and refracted-wave modes are produced as well as wave fronts than travel directly through the water from source 20 to the sensors such as 12 to generate water arrivals that are useful in measuring the water velocity.

Because of their high amplitude, low frequency and low velocity, Stoneley waves, which might aptly be termed Submarine Ground Roll in a manner analogous to Rayleigh-wave phenomena on dry land, seriously interfere with and obscure the displays of seismic reflections on record sections. Under conventional practice, seismic explorationists go to great lengths to eliminate boundary waves by various stratagems of spatial and instrumental filtering combined with complex source arrays and sophisticated data-processing computer routines. It is in that matter that this invention departs radically from routine exploration procedure wherein I put to productive use the trash signals eschewed by others.

Figure 3:
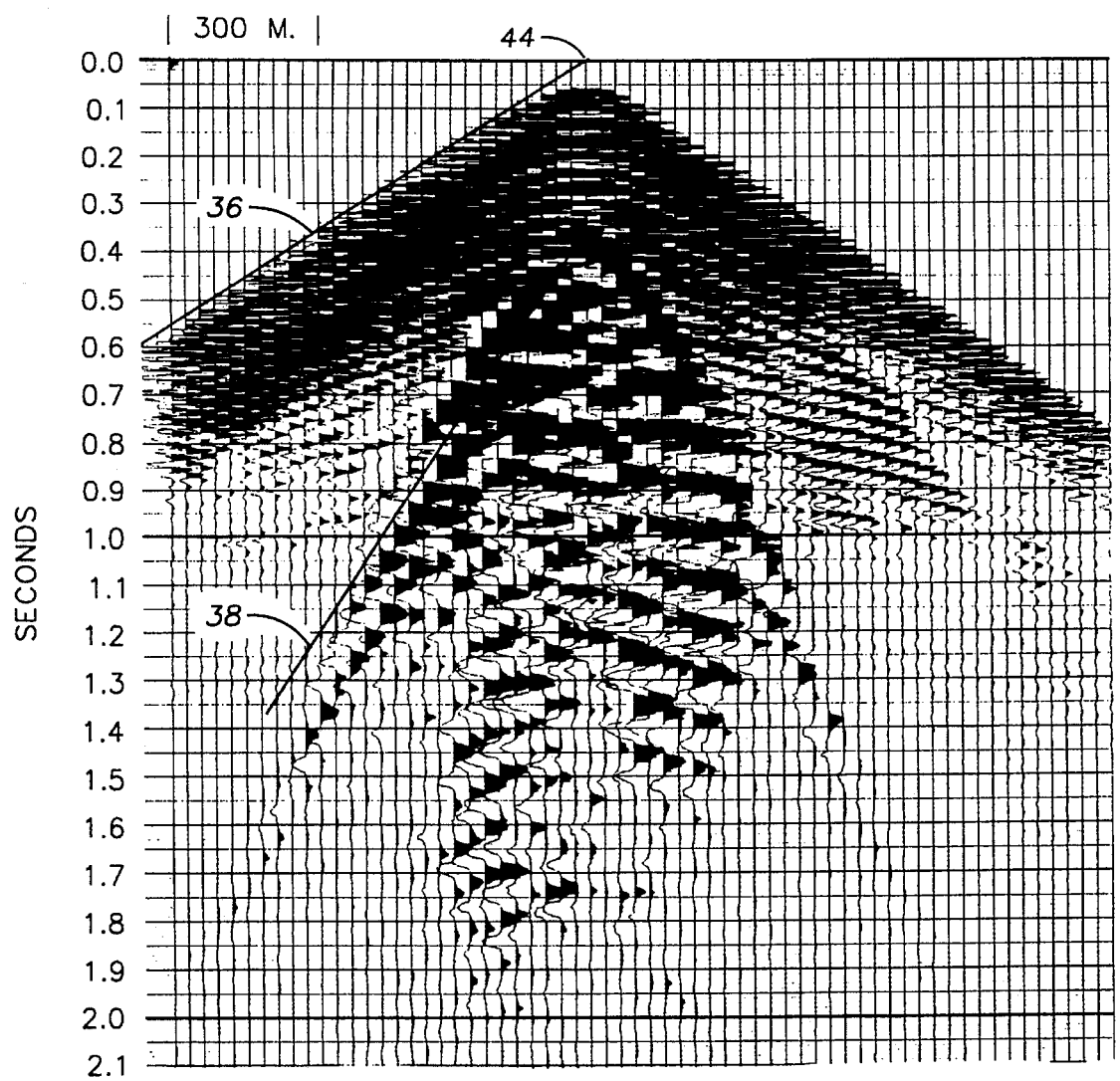
FIG. 3 is a time scale display of multimode seismic wavefield arrivals plotted as a function of sensor spacing along the array of FIG. 1.

The presently-preferred mode of operation is best shown by a field example as embodied in the record section of FIG. 3. FIG. 3 is a display of a plurality of time scale recordings, previously stored in the memory of a programmable computer such as 17 of FIG. 1, of multimodal wavefield signals as detected by an array of seismic sensors, the recordings being plotted as a function of seismic sensor spacing. Each vertical trace is a recording of seismic-event arrival times measured, in seconds, along the vertical axis. The horizontal spacing between each trace is 30 meters.

A number of seismic events may be seen on the record section, which are decomposed into separate data sets representative of the wavefield modes of interest with respect to this invention, namely: The refracted arrivals marked by line 36 and the very low-frequency Stoneley (boundary) wave arrivals marked by line 38. By inspection of the slope of line 36, that is, taking the difference in travel time vs. sensor spacing or by use of an interactive computer program for picking the arrival times, the velocity of the refracted arrival is about 1500 m/s. That value is close to water velocity and may represent a refraction through a halmyrolitic zone above a harder water-bottom formation. The slope of line 38 indicates a boundary-wave velocity of about 615 m/s. From the water bottom reflection which arrives at about 0.060 second, the water depth is about 43.5 meters.

The quantity to be determined is the shear-wave velocity for the sea-floor material using formulation (5). The input data needed are the P-wave velocity, $V_p$, of the sea-floor material, the water velocity, $V_1$, the boundary wave velocity, c, the water density, $\rho'$, and the bulk density of the sea-floor material, $\rho$. The water velocity and density are assumed to be known a priori to be 1450 m/s and 1028 kg/m³ respectively. The Arithmetic Logic Unit (ALU) of computer 17 may be programmed to compute the dimensionless reflection coefficient, k, with the aid of (7) from the known values for water velocity and density and the measured value for $V_p$; it is found to be 0.06. Alternatively, k could be measured by application of the method taught by the '150 reference earlier cited. Using the so-determined value for k, the bulk density $\rho$ for the sea floor material is determined from (6) by the ALU to be 1199.2 kg/m³.

The shear-wave velocity vector f(V) for the sea floor material may now be calculated from (5) by iterative numerical substitution and bracketing as explained earlier. Since it is known that the shear wave velocity is about half the P-wave velocity but greater than the boundary wave velocity, a reasonable initial estimate might be 750 m/s for $V_s$. The computer 17 is programmed to iteratively provide solutions for (5) from the initial value of 750 m/s and subsequent values incremented at intervals of 10 m/s after each iteration until the error residue changes sign, that is, until f(V) becomes less than zero. The progression is shown in the first column of Table 1 below:

TABLE 1

| $V_s$ | Residue | $V_s$ | Residue |
|---|---|---|---|
| 750 | 0.06192 | 771 | 0.006487 |
| 760 | 0.033612 | 772 | 0.004211 |
| 770 | 0.008793 | 773 | 0.001965 |
| 780 | −0.01295 | 774 | −0.00026 |
| 790 | −0.03186 | 775 | −0.00244 |
| 800 | −0.04855 | 776 | −0.00460 |

Given a sign change between 770 and 780 m/s, the calculations are repeated using 1–m/s increments (second column) to refine the estimate which turns out to be 773.5 m/s. Of course, the solution could be obtained after a single pass, given sufficiently small incremental steps. Further refinement is believed to be unproductive for practical application.

Figure 4:
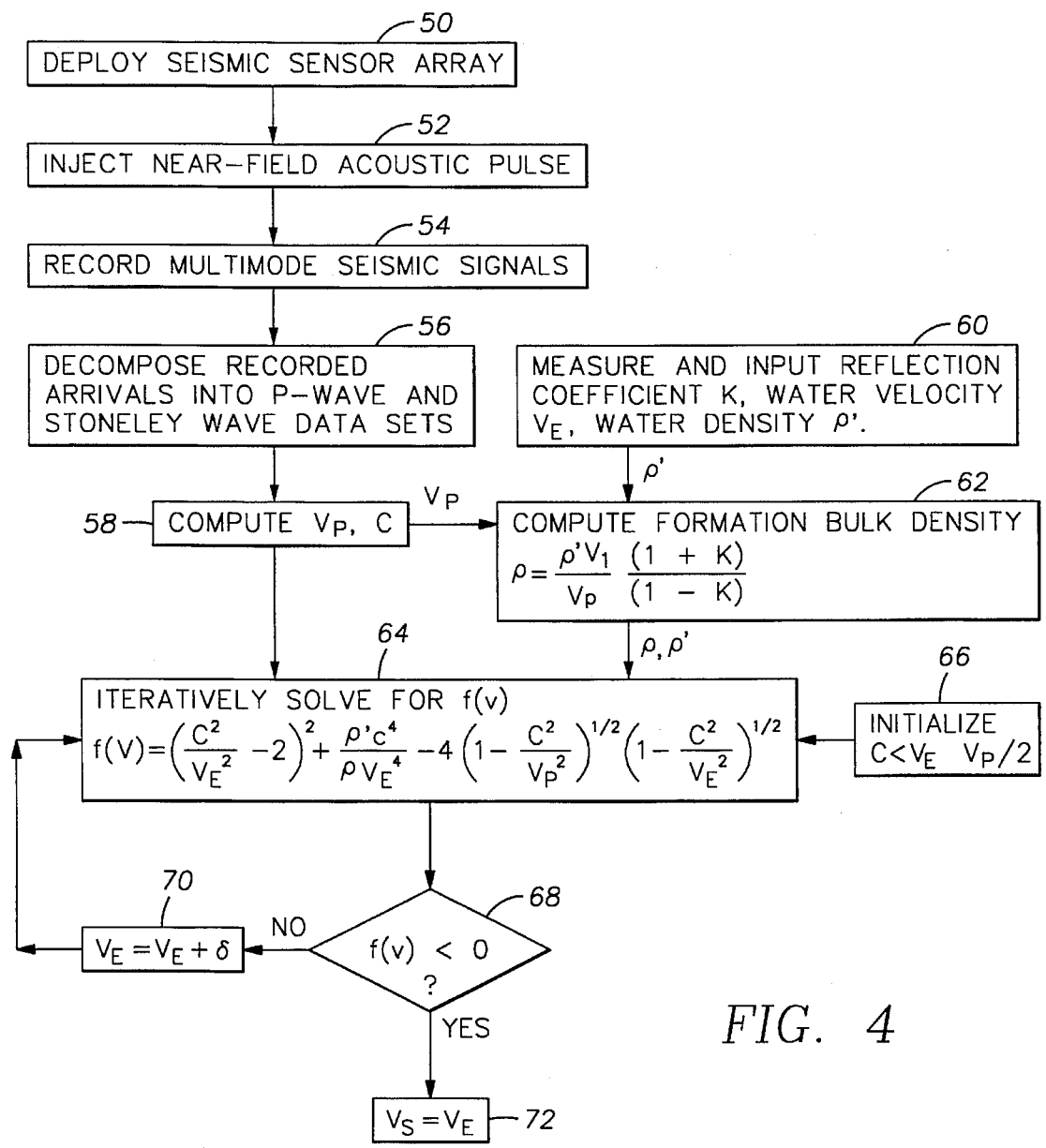
FIG. 4 is a flow diagram showing the method of processing the seismic wavefield arrivals.

FIG. 4 is a flow diagram of the process and computer program useful for solving for $V_s$ of formulation (5). Seismic signals are generated by a source for reception by seismic sensors in steps 50 and 52. The multimodal seismic signals are stored in a suitable storage means such as a programmable computer in step 54. At step 56 the recorded signals are decomposed into P-wave and boundary wave data sets by use of any well-known interactive arrival-picking processing routine, whereupon velocities $V_p$ and c are derived. Water velocity and water density, which are assumed to be known a priori are input to the program at step 60. The reflectivity coefficient, k, is measured and is also input to the routine at 62 to compute the density of the sea floor material. The P-wave velocity, $V_p$, the boundary wave velocity, c, the bulk density p and the water density, $\rho'$, are entered into subroutine 64. Using an estimated initial value $V_E$ which is greater than the boundary wave velocity but equal to or less than half the P-wave velocity, subroutine 64 is iteratively executed to provide a value for f(V). At 68, after each iteration, f(V) is tested for a sign change from + to − and is incremented by δ at 70 until f(V)<0 at which point, the value for $V_E$ is accepted as the best estimate of $V_s$, the shear wave velocity vector of the sea floor material.

This invention has been described with a certain degree of specificity by way of example but not by way of limitation. Those skilled in the art will devise obvious variations to the examples given herein but which will fall within the scope and spirit of this invention which is limited only by the appended claims. The sensors may respond to displacement, pressure, velocity, acceleration or jerk, just so long as the output signals are suitably shaped and scaled for compatibility with industry standards. The acoustic source, the transmission means and the data recording means may be of any desired type now known or yet to be discovered.

What is claimed is:

1. A method for quantitatively estimating and for using selected elastic parameters of a formation that lies beneath a body of water having a known density, comprising:

injecting a near-field acoustic impulse from a source into the formation, said acoustic impulse presenting a significantly curved wavefront to the water-formation boundary for generating a multi-modal acoustic wavefield that includes at least a refracted-wave propagation mode and a boundary-wave propagation mode;

deploying an array of spaced-apart seismic sensors beneath the surface of said body of water along a selected line of survey for detecting acoustic signals comprising said multi-modal acoustic wavefield;

measuring the water velocity;

providing a programmed computer in communication with said seismic sensors, said computer including at least a data recording means, a programmable central processing unit (CPU) and a display means;

storing in said recording means, in time scale format as a function of sensor spacing, signals indicative of the arrival times of the detected acoustic signals at each said seismic sensor;

decomposing the stored signals into separate data sets corresponding to the individual propagation modes of said multimodal wavefield;

programming a first portion of the CPU to resolve the respective arrival-time signal indications with the corresponding sensor spacings for each of the separate data sets to derive the refracted formation velocity and the boundary wave velocity;

programming a second portion of the CPU to calculate the reflection coefficient of the water bottom from the measured water velocity and the refracted formation velocity;

programming a third portion of the CPU to calculate the density of the formation from input values for the water velocity, the known water density and the calculated reflection coefficient; and programming a fourth portion of the CPU to iteratively calculate the shear wave velocity vector of the formation along said line of survey from the known value for water density, the calculated formation density, the refracted formation velocity and the boundary wave velocity.

2. The method as defined by claim 1, comprising:

programming the third portion of the CPU to calculate the density of the formation from the formulation:

$$\rho = \frac{\rho' \alpha'}{\alpha} \frac{(1+k)}{(1-k)}$$

where $\rho$=formation density, $\rho_p$=known water density, $V_p$=derived refracted formation velocity, $V_1$=known water velocity, and k=measured reflection coefficient.

3. The method as defined by claim 1, wherein:

said near-field acoustic impulse is generated from an acoustic source that is located within a preselected radius from the water/formation boundary.

4. The method as defined by claim 3, wherein:

said preselected radius satisfies the inequality:

$$0 \leq r < 10 \text{ meters.}$$

5. The method as defined by claim 2, comprising:

programming said fourth portion of said CPU is to solve the following formulation by iterative numerical substitution:

$$(c^2/V_s^2-2)^2+\rho' c^4/\rho V_s^4-4(1-c^2/V_p^2)^{1/2}(1-c^2/V_s^2)^{1/2}=0,$$

where c=boundary wave velocity, $V_s$=shear wave velocity.

6. A method as defined in claim 2, further including estimating the load-bearing characteristics of the sea floor at a selected location, comprising:

using the parameters of shear and refracted formation velocity and formation parameters estimating selected moduli of elasticity of the sea floor including Young's modulus and Poisson's ratio, at said selected location.

* * * * *